United States Patent [19]
Pekelman

[11] Patent Number: 5,838,883
[45] Date of Patent: Nov. 17, 1998

[54] COPYING ATTACHMENT FOR DIGITAL PRINTING PRESS

[75] Inventor: Gil Pekelman, Rosh Haayin, Israel

[73] Assignee: Portalis, Rosh Haayin, Israel

[21] Appl. No.: 718,250

[22] Filed: Sep. 20, 1996

[51] Int. Cl.[6] .............................. G06F 15/00; H04N 1/21
[52] U.S. Cl. ........................ 395/106; 395/114; 395/115; 395/116; 358/296
[58] Field of Search .................... 395/106, 109, 395/102, 105, 108, 112, 114, 115, 117, 101; 358/296, 448, 409, 442, 474, 515, 401, 468; 399/1, 2

[56] References Cited

U.S. PATENT DOCUMENTS

| | | | |
|---|---|---|---|
| 4,674,737 | 6/1987 | Murayoshi | 271/124 |
| 4,734,760 | 3/1988 | Futaki | 358/442 |
| 5,043,749 | 8/1991 | Punater et al. | 346/157 |
| 5,045,967 | 9/1991 | Igarashi | 364/518 |
| 5,428,464 | 6/1995 | Silverbrook . | |
| 5,463,295 | 10/1995 | Inde | 358/442 |
| 5,467,436 | 11/1995 | Rodi et al. | 395/114 |
| 5,481,365 | 1/1996 | Arimoto . | |
| 5,596,427 | 1/1997 | Hinma et al. | 358/515 |

*Primary Examiner*—Edward L. Coles
*Assistant Examiner*—Mark Wallerson
*Attorney, Agent, or Firm*—Mark M. Friedman

[57] ABSTRACT

A copying attachment that enables employing a fast high-quality digital press also as a direct copier. The printing engine of the digital press is fed, through an image processor and, possibly, a buffer memory, image data that is obtained directly from a scanner—all operating under a common and automatic control.

28 Claims, 2 Drawing Sheets

COPYING ATTACHMENT FOR DIGITAL PRINTING PRESS

FIELD AND BACKGROUND OF THE INVENTION

The present invention relates to a digital printing press and, more particularly, to an attachment to a digital press that, in effect, converts it into a copier.

In recent years digital printing presses, and particularly full color digital presses, have been marketed and put to use. Unlike conventional printing presses, such as offset-lithographic presses, where the image to be printed is first set into a printing plate and then the plate is mounted onto the press, where it serves repeatedly to imagewise transfer colorant (namely, in this case, ink) to the blanket roller and thence to the paper, a digital press receives the image in digital code and it is within the press that the code is converted into an actual colorant image, which is directly or indirectly transferred to the paper. The main advantage of digital presses over conventional ones is that they make it relatively easy, and therefore inexpensive, to change printed images. They are therefore economically more suitable for short run printing jobs, that is—printing a small number of copies, typically less than 500. They are also more suitable for rush jobs than are conventional presses, where the extra time taken by plate preparation and the press make-ready process may not be acceptable. Most digital presses also have the unique advantage of enabling changing part of the image between impressions, such as for personalization.

Typically, a digital press includes an image writing device, to which the digital image is fed, encoded in a so-called raster format, that is—line by line. The thus formatted image of a complete page is usually obtained from a so-called digital front end (DFE) that generates a complete page image in raster format out of digital image data received from, say, a pre-press system. Depending on the configuration of the digital press, the DFE may be integrated with the press or it may be a separate unit, connected to the press by a communication cable.

Two examples of commercially available color digital presses are the E-Print 1000 by Indigo NV of Maastricht, the Netherlands, and the Chromapress by Agfa-Gevaert Corp. of Mortsel, Belgium, (which includes the DCP-1 printing engine by Xeikon of Mortsel, Belgium). Each of these two types of presses includes a printing engine that uses a laser-based writing device and an electro-photographic process. The E-Print 1000 writes the image as binary values along a raster of 800 lines to the inch and it uses a liquid toner, trade-named ElektroInk, to form the colorant image; it prints the four printing colors sequentially on one side of a pre-cut sheet; for duplex printing, the sheet is turned over. The Xeikon printing engine writes the image as multi-level values along a raster of 600 lines to the inch and it uses a uniformly fine dry toner to form the colorant image; it prints all four printing colors simultaneously (staggered on successive imprints) on a continuous web—imprinting both faces of the web (duplex) simultaneously. Characteristically, digital presses of these two types, to be collectively referred to as electro-photographic (EPG) presses, rewrite the page image from its digital representation once for each copy printed. For this purpose, the page image, in the digital raster format, is stored in a print buffer and is repeatedly read out and fed to the writing device.

Another type of a color digital press, to be referred to as direct printing (DP) press, is exemplified by the CDP made by Scitex Digital Systems of Dayton, Ohio, which has been publicly exhibited. It is a high-speed press that uses an array of ink jets to write the image directly onto the print medium, such as paper. It currently writes the image as a raster of about 200 lines to the inch at a speed on the order of 200 feet per minute.

Yet another type of a color digital press, to be referred to as digitally writable offset press, is exemplified by the GTO-DI or the Quickmaster, made by Heidelberg Druick-maschinen. It is basically an offset-lithographic press, which utilizes an image-carrying plate, or cylinder for printing but where the image is set onto the plate directly on the press; that is, the press includes an image writing device, which is fed image data in raster format, in essentially the same manner as the other types of digital presses described hereabove. Unlike these other types, though, the image remains on the plate, to print all the desired copies, and thus need not be rewritten for each copy. Typically the writing raster has over 2000 lines to the inch.

While digital presses may be of various types, having different performance parameters, such presses are generally characterized by all of the following (except as noted):

(a) high printing speeds—at least 17 color pages of size A3 per minute;

(b) (except DP presses) high printed image quality (as measured by resolution, contrast, uniformity, color gamut and tonal range)—exceeding that of high-quality copiers and computer output printers and approaching or equaling that of offset presses;

(c) printing on a variety of print media, including a large range of heavy and glossy papers;

(d) construction as a production machine, for long continuous operation—emulating conventional presses;

(e) need for a skilled operator.

In the present context, digital presses should be distinguished from so-called computer output printers. The latter are designed to print only one copy or a few copies at a time, while digital presses are designed to print a quantity of copies—usually for wide distribution; accordingly, digital presses are characteristically much faster than computer output printers and generally produce considerably better print quality, as mentioned hereabove. Digital presses in the present context should also be distinguished from another type of a printer, recently introduced and exemplified by the Spontane, by Scitex Corp., and the DocuColor 40, by Xerox Corp. (both of which use a printing engine made by Xerox Corp.), where a color copier is supplementarily equipped with a DFE to convert it into a digital output printer—thus emulating a digital press. While the printing speed of such a printer is indeed similar to that of the slower (EPG-type) digital presses described hereabove, it differs from digital presses in all the other characteristics (b–e) listed hereabove. In any case, the present invention is not applicable to such a printer.

Owing to their intended primary usage for short-run and rush printing jobs, digital presses, other than the DP type, have been largely installed in so-called quick-print shops and in service centers for desktop publishing.

A major current problem with digital presses, especially of the EPG and WOPM types, is their under-utilization; that is, there are not enough printing jobs ordered for them to keep installed machines running more than a fraction of the working hours. The primary reason for this situation is that the need for, and advantages of, short-run printing have not yet been fully absorbed by traditional print buyers, who therefore have not yet made the necessary changes in their operating mode. Another reason for the under-utilization of digital presses is the relative novelty of such presses, hence unfamiliarity from the side of many potential customers. Yet another reason is that many customers who produce their work on desktop publishing systems often prefer to print out their original digital pages immediately on computer output printers and then produce multiple copies by means of a copier. The main reason for this practice is, in turn, that these customers want to see the final result before duplicating it, whereas if they give the digital file to the service bureau for printing on a digital press, numerous problems may arise there in the process of preparing it to print, which could cause waste of time and money, as well as increase the probability that the final print will be different from the designed image. Also, cutomers may occasionally wish to manually add to, or modify, the image, and therefore need a hard original copy from which to make duplicates. For this purpose and for others, service bureaus also provide copying services, using color copying machines (or copiers, for short). Copying is, of course, already a major business of quick-print shops.

In a typical color copier, a reflective original document is placed in a scanning, or reading, section and while it is being scanned, the image signals are fed to a writing engine, usually of the electro-photographic type, which produces a replicated image on paper or, sometimes, on a transparency medium. It is noted that in a copier, the scanning and writing sections, as well as all electronic components and the user interface, are characteristically housed in a single housing. Copiers generally use the same printing technology as computer output printers and thus, even those of high quality, suffer from similar disadvantages when compared to digital presses, namely—

(a) low printing speeds—typically three color copies per minute;

(b) low printed image quality (except when compared to DP presses);

(c) printing on standard uncoated paper (in contrast to the variety of print media, including a large range of heavy and glossy papers, handled by digital presses);

(d) construction as an office machine, for non-continuous operation, usually requiring frequent service;

Faster color copiers, running at the equivalent of about twenty A3 copies per minute, have recently been introduced, but they are very expensive A digital press represents a major investment; its under-utilization therefore causes losses to its owner and discourages potential new users from purchasing one. In light of the copying needs of most users, some of which were noted hereabove, if the digital press could also serve as a fast copier, it would be more fully utilized and thus more economical to operate, as well as provide necessary additional services. A digital press with a copying capability would enable offering customers economical and reliable high-speed high-quality printing and copying, without the need to also invest in copiers, especially costly high-speed copiers. By thus dispensing with copying machines, the owner would also save on floor space and could reduce the operating staff.

One way of endowing a digital press with such copying capability is to use prior art equipment, namely a digital prepress system that includes a scanner: The original document would be scanned by the scanner and the resulting digital data—fed into the storage disk of the system; the data would then be formatted in the system as a page, then read out from storage and fed to the digital press. Such a process is disadvantageous, because it is lengthy and requires considerable operator time—which makes the cost of the process prohibitive; it also takes up the time of fairly expensive equipment, which otherwise would be more gainfully engaged; furthermore, quick-print shops rarely have the expertise for such an operation.

There is thus a widely recognized need for, and it would be highly advantageous to have, an attachment to currently available digital presses that would endow them with direct and automatic copying capabilities.

SUMMARY OF THE INVENTION

The present invention successfully addresses the shortcomings of the present digital presses by providing a copying attachment that enables employing them also as direct copiers.

The present invention discloses a novel approach to document copying, especially when making multiple copies, whereby the fast high-quality digital printing engine of a digital press is fed, through an image processor and, possibly, a buffer memory, image data that is obtained directly from a scanner—all operating under a common and automatic control.

More specifically, the copying attachment of the present invention, comprises a scanner, preferably a color scanner, of suitable speed, to which is preferably attached an automatic document loader and unloader;

an image processor that, in the case of color scanning, converts the RGB output of the scanner into CMYK color representation and then converts the tonal values—into a screen pattern;

preferably a double page buffer RAM, which alternately stores successive scanned images in printing format, to be fed directly to the printing engine; and a copying controller, which coordinates the operation of all the aforementioned units and enables automatic copying under commands entered by an operator, preferably through a user interface provided herein.

In normal operation, a document is automatically loaded into the scanner and scanned, while the resulting signal is being processed into the final printing format and stored in the page memory; meanwhile a previously scanned image is being read out of the page memory and transferred to the printing engine, which prints the resulting copies; the reading out is repeated for each copy desired; then a newly scanned image is read out for the next run of copies. The image processor, under control of the user interface, also optionally enables image improvement and -modification functions, such as sharpening, contrast enhancement and color adjustment; other functions offered include image scaling, multiple images and simple merging.

According to the present invention there is provided a copying attachment for enabling a digital press to serve as a copier, the copying attachment comprising:

(a) a scanner, for scanning an image on an original document;

(b) a digital image processor, connected to the scanner and receptive to image data output therefrom, the output of the image processor having a format and values receptive by the digital press; and (c) a copying controller for controlling the operation of the scanner and the image processor in time coordination with the operation of the digital press; the operation of the scanner being controlled by the copying controller.

According to further features in preferred embodiments of the invention described below, the copying attachment further comprises a document feeder, attached to the scanner, arranged to automatically feed documents to the scanner under control of the copying controller, and a user interface means, connected to the copying controller.

According to still further features in the described preferred embodiments, the copying attachment further comprises a page buffer, receptive to the output of the image processor and preferably controllable by the copying controller, the output of the page buffer being connected to the digital press; the page buffer preferably includes at least two sections, each section having the capacity to store image data for a complete page and being independently readable or writable.

According to another configuration, the page buffer has two ports, operative to enable concurrent writing into, and reading out of the page buffer.

According to yet another configuration, the digital press includes a print buffer and the output of the image processor is connected to the input of the print buffer.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of an attachment to a color digital press that endows it with the capability of serving as an automatic copier.

Specifically, the present invention can be used to directly and rapidly make high-quality copies of original documents, utilizing a digital press.

The principles and operation of a copying attachment according to the present invention may be better understood with reference to the drawings and the accompanying description.

Figure 1:
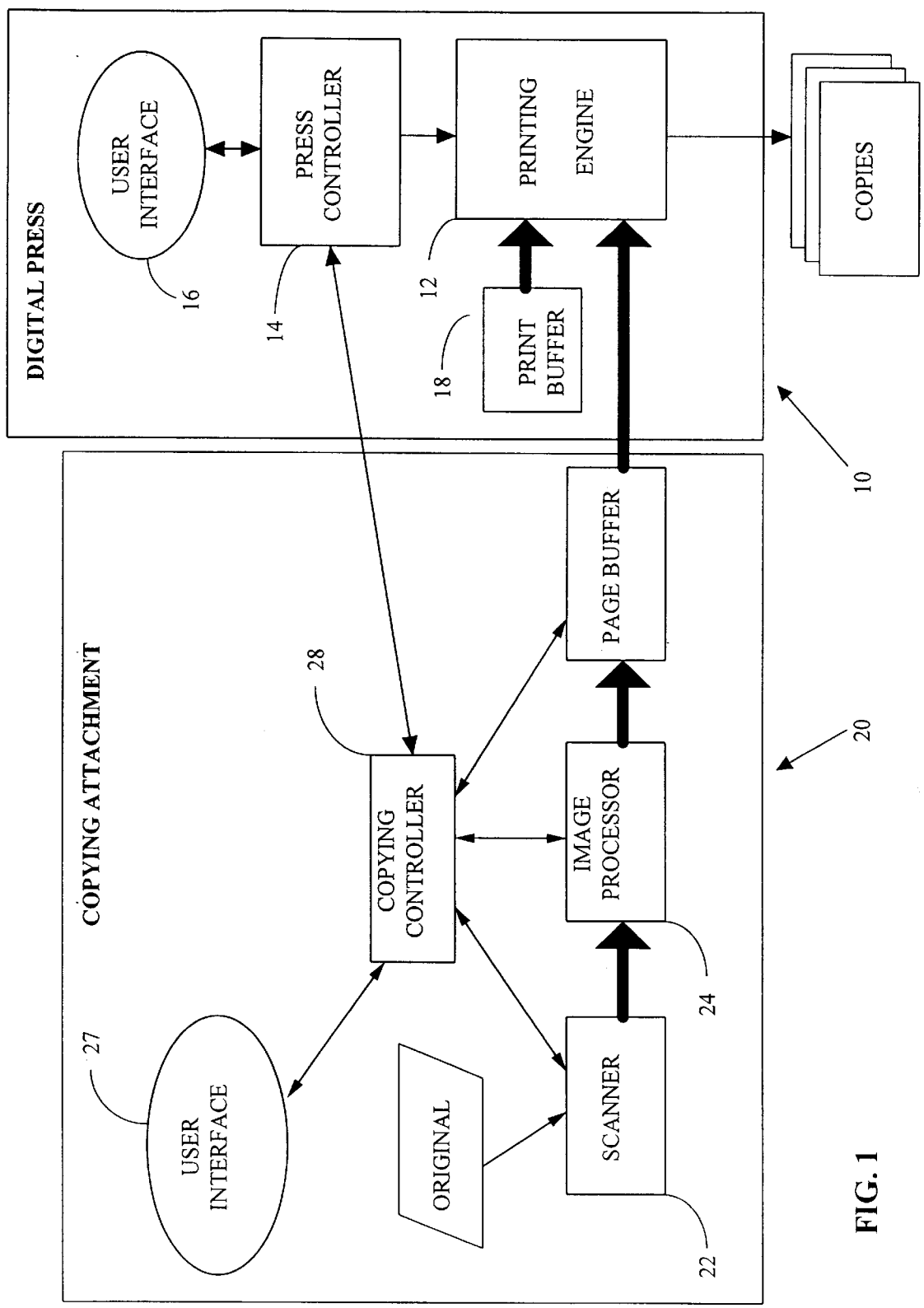
FIG. 1 is a block diagram of the entire copying system, including the attachment according to the invention.

Referring now to the drawings, FIG. 1 illustrates, in block diagram, a preferred configuration of a complete copying system, including a digital press 10 and the copying attachment 20. The digital press, which has been described in the background section hereabove, is here shown, by way of example, as comprising a printing engine 12 a press controller 14, a print buffer 18, and a user interface 16. The digital press may also have other components, such as a digital front end (DFE), but these are irrelevant to the present discussion. Print buffer 18 receives image data in raster format, usually from a DFE, which may be external to digital press 10 or integrated therewith. In presses of the EPG- and DP types, print buffer 18 serves to hold the page image for many copies over the print run; in WOPM-type presses it may not be required. Printing engine 12 receives image data from print buffer 18 and prints copies accordingly; in case of color copying, the data for all four printing colors are obtained either simultaneously or sequentially, depending on the type of the digital press. Press controller 14 controls the operation of printing engine 12, coordinates the data flow between it and print buffer 18 and communicates with user interface 16 and with other components of the system. User interface 16 includes a display and a keyboard and enables communication between an operator and the digital press and top control of its operation.

The copying attachment (20), which constitutes the present invention, consists of a scanner 22, an image processor 24, a page buffer 26, and a copying controller 28. The scanner (22) is basically a high-speed high-quality color scanner, such as commercially available—for example, as model ScanJet 4c from Hewlett-Packard Co. of Palo Alto, Calif. Scanner 22 is modified so that its operation is entirely automatic—controlled by copying controller 28. Preferably a sheet feeding and loading mechanism is attached to the scanner, for automatically feeding into it original documents from a stack, and a sheet unloading mechanism, for unloading and restacking the scanned documents. Such mechanisms are widely used and known in the art, in conjunction with various scanners, printers and facsimile machines, but they are also modified to be controllable by copying controller 28. Scanner 22 preferably reads and outputs data for the three primary colors (red, green and blue, or RGB, for short) simultaneously. Scanner 22 is also operable in monochromatic mode.

The image processor (24) is a fast digital processor and carries out two major functions—(i) conversion of the additive representation of color (RGB), as output by scanner 22, into subtractive representation, or print color components (CMYK), as accepted by printing engine 12; (ii) conversion of tonal values of the print color components into half-tone values, that is—into a geometric pattern of binary or multi-level values, termed screen. Both functions are carried out by means of digital hardware and digital algorithms well known in the art; they are, however, particularly adapted to the characteristics of printing engine 12. Certain types of scanners may have the color conversion function 'i' already integrated, so that their output is in CMYK representation; in this case, image processor 24 need not perform this function, but may be called upon to perform some modifications of the obtained values—for example, to effect more correct printed colors, according to calibration with printing engine 12. Function 'ii' is adapted to the particular capabilities and parameters of printing engine 12, such as writing resolution and tonal characteristics. Optionally, image processor 24 carries out additional functions, mainly of two categories—image enhancement and gross geometric changes (or sizing). Image enhancement includes functions such as sharpening, contrast enhancement and color adjustment; geometric chances offered include image scaling and multiple images on a page. Additional functions may include cropping and simple masking and merging of images; the latter may, for example, provide personalization capabilities. The output of image processor 24 is fed to page buffer 26

The page buffer (26) is preferably a dual random-access memory (RAM), consisting of two independently addressable sections. Each section can store the data for printing one complete page. For clarification, the term page is here used to denote the entire image to be printed on one side of a sheet; it does not refer to possible divisions of this image, such as book pages, columns or other image units. The two sections serve alternately and complementarily for input and for output of page data; that is, while data is input to one section, data is output from the other section, and vice-versa. During input, the image data are fed from image processor 24 and stored in sequence; during output, the image data are read out in sequence, at a sufficiently high rate, and fed to printing engine 12. In an alternative configuration of page buffer 26, there is a single dual-ported RAM, known in the art, in which both ports can function concurrently (e.g. in an interleaved manner); one port serves for input, while the other port serves for output. The data are stored in the CMYK color representation and, preferably, in screened raster format. If the digital press is of the type that prints all colors simultaneously, page buffer 26 must store the data for all four colors. Preferably all colors are stored also in the case of sequential color printing, so that multiple copies of the same page can be printed at maximum speed. In the case that the digital press is of the duplex type, that is, printing both sides of the sheet simultaneously, and if duplex copying is desired, each section of page buffer 26 preferably stores the data for two complete pages.

Digital image data output from page buffer 26 is fed, via a cable and a connector preferably to the data entry point of printing engine 12, where the input to the printing engine can be switched between such data path, when copying function is desired, and the conventional data path from the print buffer of the digital press, when computer output printing is desired.

The copying controller (28), which essentially is a small special-purpose computer, serves to control the operation of the other components of copying attachment 20. In particular, it serves to coordinate the operation of image processor 24 with scanner 22 and with the input side of page buffer 26, and to coordinate the output side of page buffer 26 with the operation of printing engine 12. For the latter function, the copying controller also communicates with press controller 14 of digital press 10. This communication path also serves to enable top control of the copying operation by the operator through user interface 16. The software of digital press 10 that governs operation of press controller 14 and of user interface 16 is modified accordingly. In particular, the software is given the capability to switch the data input to printing engine 12, as described above, to switch control coordination between copying controller 28 and the conventional digital front end and to present to the operator, over user interface 16, two operational modes—one for conventional printing and one for copying; for the latter mode, suitable operator display and control functions are added to the software.

Typical operation of the system for color copying proceeds as follows: One or more original document sheets are placed in the feeder of scanner 22. Copying mode is selected at user interface 16 and appropriate information, including desired number of copies, is entered therein. Thereupon the first original sheet is fed to scanner 22 and scanned. The resultant digital signals, in RGB raster format are fed to image processor 24. The RGB data are then converted to CMYK representation. According to instructions optionally entered in user interface 16, the data undergo further processing, to carry out image enhancement and -sizing functions. The resultant image values are converted to a screen pattern in binary (or multi-level) raster format at the printing resolution, which is stored in one section of page buffer 26. The next original sheet is then fed to scanner 22 and the process repeats, this time storing the output data in the second section of page buffer 26. Meanwhile data from the first section of page buffer 26 are read out and fed to printing engine 12, which produces a printed copy accordingly. If additional copies of the first original are desired, the data are again read out of the first section of page buffer 26 and fed to printing engine 12 and this process repeated for each copy. Otherwise the next data are read out of the second section of page buffer 26, while another original is scanned and its data stored in the first section, and so on. Variations of this procedure for the various component configurations mentioned hereabove and for monochromatic copying should be obvious to persons knowledgeable in the art.

Figure 2:
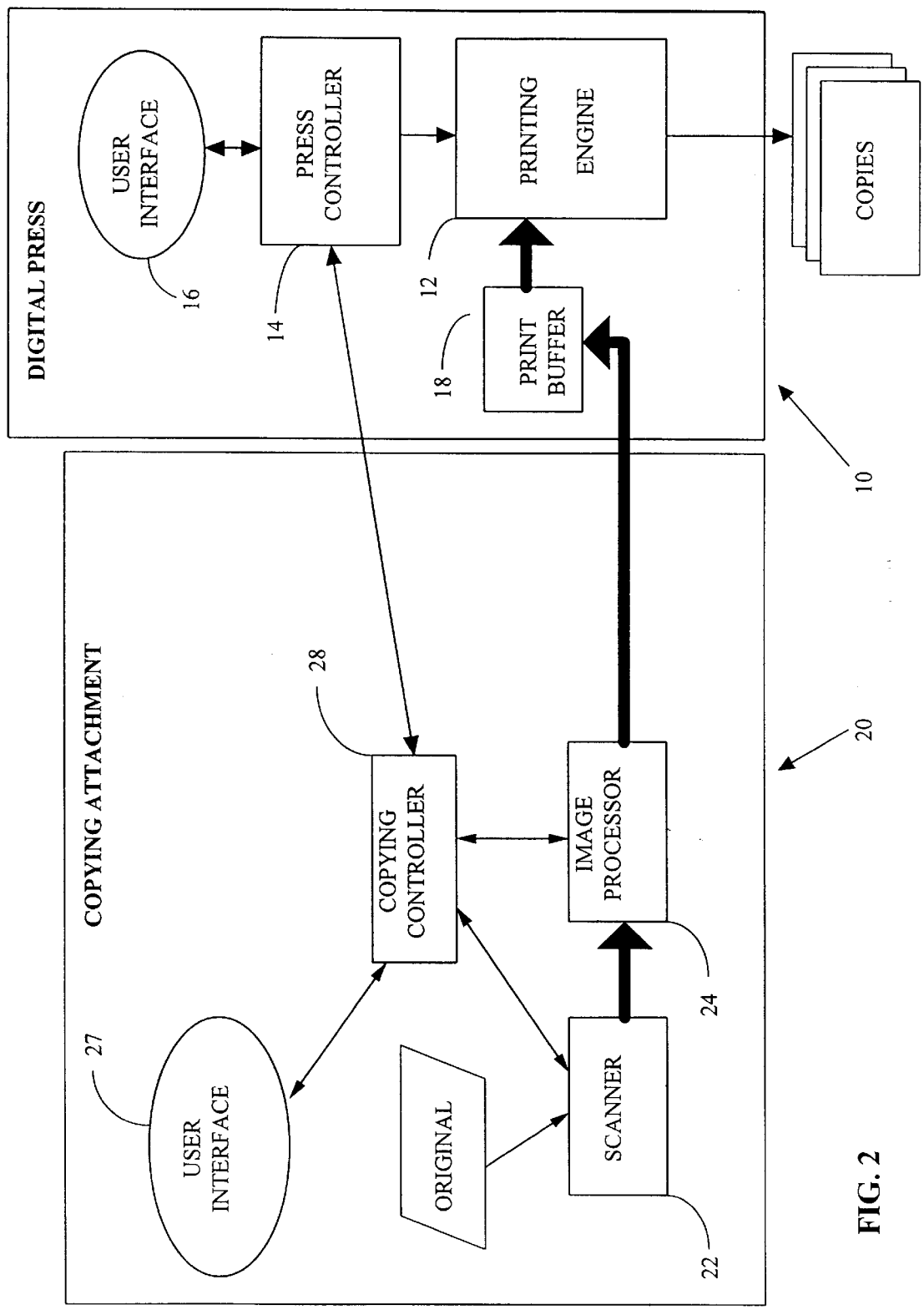
FIG. 2 is a block diagram of another configuration of the system of FIG. 1.

Another possible configuration is shown in FIG. 2, again as a block diagram of the copying system. This configuration differs from that of FIG. 1 basically in that print buffer 18 of digital press 10 is used instead of the page buffer (26) of the first configuration, thus saving the expense of providing the latter as part of the copying attachment. In the case of a WOPM-type digital press, there may not be any need for a page buffer. Image data output by image processor 24 are fed to print buffer 18, through a suitable digital input switch, and stored therein. During printing, the data are read out of print buffer 18 and fed to the input of printing engine 12, as in normal digital press operation. In the case of a WOPM-type digital press, image data may be fed directly from image processor 24 to the printing engine 12. In this configuration, copying controller 28 serves to directly coordinate operation of the scanner and of the image processor with the operation of the digital press. Another possible advantage of this configuration is that it requires less modification of the press controller and its software. A possible disadvantage is, when print buffer 18 is not a double memory or dual ported, that no printing can take place during scanning or image-processing operation and vice versa.

The digital electronic units of the copying attachment—image processor 24, copying controller 28 and (in the first configuration) page buffer 26—are preferably housed together, within one enclosure, which is integrated either with the housing of scanner 22 or with the digital press. The two physical units are connected by cables.

In a variation of either of the two configurations described hereabove, there is a user interface 27 directly associated with copying controller 28, which includes a display preferably mounted on the housing of the digital components of the copying attachment. User interface 27 becomes operational whenever the main user interface (16) of the digital press is set to copying mode. The software for running user interface 27 resides in copying controller 28. During copying mode, user interface 27 also serves to control basic operation of printing engine 12.

In another variation of either configuration, scanner 22 may be shared with a digital pre-press system, such as would be used to feed image data to the digital press in its normal mode of operation. The output of the scanner would then be routed through a switch either to image processor 24, for operation in the copying mode, or to the prepress system. Control of the scanner will be switchable correspondingly between copy controller 28 and the pre-press system. The term pre-press system is here used to include any computerized graphics system operative to feed image data to the digital press.

While the invention has been described with respect to a limited number of embodiments, it will be appreciated that more variations, modifications and other applications of the invention may be made. It will also be appreciated that, while the invention has been described with respect to color copying, it may also be applied to monochromatic copying with minor or no modifications.

What is claimed is:

1. A copying attachment, attachable to a digital press, which is normally configured to print out digital image data received from external sources for enabling the digital press to also serve as a copier for copying an original document, the copying attachment comprising:

(a) a scanner, for scanning an image on the original document;

(b) a digital image processor, connected to said scanner and receptive to image data output therefrom, the output of said image processor having a format and values receptive by said digital press;

(c) a buffer memory, receptive to image data output from said image processor and operative to store at least one full color page image; and (d) a copying controller, for controlling the operation of said scanner, said image processor and said buffer memory;

said controller being operative to cause a full color page image to be output from said buffer memory and to cause said digital press to print out one or more copies of said page image.

2. The copying attachment of claim 1, further comprising a user interface means, connected to said copying controller.

3. The copying attachment of claim 2, wherein said image processor is operative to modify the appearance of images on said printed copies in accordance with information input through said user interface means.

4. The copying attachment of claim 1, further comprising an output port and operative to switchably output to said port a digital version of an image scanned by said scanner.

5. The copying attachment of claim 1, wherein the digital press uses liquid toner.

6. The copying attachment of claim 1, wherein the digital press prints on a continuous web.

7. The copying attachment of claim 1, operative so that said scanner scans the entire image on the original document once only and prior to commencement of printing of said one or more copies by the digital press.

8. The copying attachment of claim 7, further operative so that said scanner scans the image on one original document while the digital press prints out one or more copies of another original document.

9. The copying attachment of claim 1, wherein said image processor is operative to enhance the apparent image quality of said printed copies.

10. The copying attachment of claim 1, wherein said scanner is housed separately from the digital press.

11. The copying attachment of claim 10, wherein said copying controller is integrally housed with said digital press.

12. The copying attachment of claim 10, wherein said copying controller is integrally housed with said scanner.

13. The copying attachment of claim 1, wherein said digital press is a digitally writable offset press.

14. The copying attachment of claim 1, wherein said digital press is operative to print on both faces of a print medium and wherein said buffer memory is operative to store at least two full color page images.

15. A combination digital press and copier, comprising:

(a) a digital press, which is normally configured to print out digital image data received from external sources;

(b) a scanner, for scanning an image on an original document;

(c) a digital image processor, connected to said scanner and receptive to image data output therefrom, the output of said image processor having a format and values receptive by said digital press;

(d) a buffer memory receptive to image data output from said image processor and operative to store at least one full color page image, and (e) a copying controller, for controlling the operation of said scanner, said image processor and said buffer memory, said controller being operative to cause a full color page image to be output from said buffer memory and to cause said digital press to print out one or more copies of said page image.

16. The combination digital press and copier of claim 15, wherein said scanner is housed separately from said digital press.

17. The combination digital press and copier of claim 16, wherein said copying controller is housed together with said scanner.

18. The combination digital press and copier of claim 15, further comprising an output port and operative to switchably output to said port a digital version of an image scanned by said scanner.

19. The combination digital press and copier of claim 15, further comprising a user interface means, connected to said copying controller.

20. The combination digital press and copier of claim 19, wherein said image processor is operative to modify the appearance of said printed copies in accordance with information input through said user interface means.

21. The combination digital press and copier of claim 15, wherein said image processor is operative to enhance the apparent image quality of said printed copies.

22. The combination digital press and copier of claim 15, operative so that said scanner scans the entire image on the original document once only and prior to commencement of printing of said one or more copies by said digital press.

23. The combination digital press and copier of claim 22, further operative so that said scanner scans the image on one original document while said digital press prints out one or more copies of another original document.

24. The combination digital press and copier of claim 15, wherein said digital press prints on a continuous web.

25. The combination digital press and copier of claim 15, wherein said digital press uses liquid toner.

26. The combination digital press and copier of claim 15, wherein said buffer memory is operative to switchably receive image data obtained from external sources and from said image processor.

27. The combination digital press and copier of claim 15, wherein said digital press is operative to print on both faces of a print medium and wherein said buffer memory is operative to store at least two full color page images.

28. The combination digital press and copier of claim 15, wherein said digital press is a digitally writable offset press.

* * * * *